Aug. 1, 1950 H. R. JARVIS 2,516,881
DETACHABLE FREIGHT CARRYING DEVICE
Filed Feb. 24, 1948 5 Sheets-Sheet 1

INVENTOR.
HAROLD R. JARVIS
BY
ATTORNEY

Aug. 1, 1950 H. R. JARVIS 2,516,881
DETACHABLE FREIGHT CARRYING DEVICE
Filed Feb. 24, 1948 5 Sheets-Sheet 2

INVENTOR.
HAROLD R. JARVIS
BY
ATTORNEY

Aug. 1, 1950

H. R. JARVIS 2,516,881

DETACHABLE FREIGHT CARRYING DEVICE

Filed Feb. 24, 1948

INVENTOR.
HAROLD R. JARVIS
BY
ATTORNEY

Patented Aug. 1, 1950

2,516,881

UNITED STATES PATENT OFFICE 2,516,881

DETACHABLE FREIGHT CARRYING DEVICE

Harold R. Jarvis, San Francisco, Calif.

Application February 24, 1948, Serial No. 10,542

23 Claims. (Cl. 214—83.12)

This invention relates to improvements in freight-carrying vehicles, such as trucks, railroad cars, airplanes, and ships, having detachable freight-carrying and freight-loading units. More particularly, this invention relates to a detachable freight-carrying unit, including a mechanism for loading and unloading. Still more particularly, this invention relates to a self-contained mechanical freight-carrying and loading device which operates satisfactorily to transfer a load between a vehicle and a dock even where the vehicle frame bed and the loading dock are at different heights.

Freight-carrying and transferring devices heretofore in use have had many disadvantages. For example, when the vehicle and dock are not on the same level and the transferring device is inclined, the load tends to slip and fall off. Both goods being transported and loading devices themselves have been damaged from unsuccessful attempts to transfer heavy freight over an inclined path between the vehicle and the dock.

Other problems have arisen because of the relatively large weight of the transferring devices heretofore used. The potential payload has been substantially limited by the dead weight of the transferring device and by the space it consumes. Moreover, these cumbersome transferring devices have required time for their assembly and have required special auxiliary equipment for their operation.

One further problem which has prevented widespread use of detachable freight-carrying units has been that they have required platforms which are heavy, expensive, and limited in their use.

An important object of the invention is to provide a freight-carrying device of such self-contained construction that one man, unassisted and without special machinery at the transfer points, can load and unload the detachable, freight-carrying units onto or off of the vehicle.

Another object of the invention is to provide a freight-transferring device by means of which load-unit pallets can be loaded and unloaded and fixed in place on a truck, railroad car, airplane, or ship, by one man using equipment which can be carried in the vehicle.

Another important object of the invention is to provide loading machinery which comprises a minimum number of lightweight parts for moving a load unit on and off the vehicle and for holding it steady thereon during transport.

A further object of the invention is to provide a loading and unloading device which will operate successfully without the need for the driver to align the vehicle exactly with the freight-receiving dock.

Another object of the invention is to provide an interchangeable, freight-carrying device which permits each unit to be loaded or unloaded without any auxiliary apparatus on the platform.

A further object of the invention is to provide a freight-loading or transferring device which will give satisfactory results when there are substantial differences in height between the receiving or loading dock and the vehicle bed.

Another object of the invention is to provide a freight-loading or transferring device in which interchangeable dollies, useful in themselves for intra-warehouse transportation, can be used as load-unit pallets.

Another object of the invention is to provide a simple and compact mechanism which functions as a lock to hold the freight-carrying platform in place on the vehicle during transport, and functions as part of a transfer ramp during loading and unloading operations.

Other objects and advantages of this invention will become apparent from the following description of a preferred embodiment of this invention. Although this embodiment is described in detail in accordance with U. S. Revised Statutes section 4888, it is not intended thereby to narrowly limit the claims, which are intended to include in their terms other materials, elements, and relationships well known in the art.

In general, this invention comprises a freight-handling device for mechanically moving a standardized load-supporting platform between two positions, as between a vehicle and a loading dock. The platform is used as a unit-load pallet and preferably has retractable casters so that it can also be used as a warehouse dolly. Its base includes a plurality of parallel, spaced-apart, bottom rails which can be keyed for linear movement with a corresponding plurality of flexible racks. The racks, in turn, are adapted to be synchronously propelled by spaced driving means, such as geared wheels, along restraining guiding grooves in the upper surface of a set of parallel tracks. Each groove is open at the top and includes an upper narrow neck portion within which the rail moves and a lower wider channel portion in which the racks move. Three kinds of tracks are employed, all of them similarly grooved: main tracks secured across the body of the vehicle, connecting tracks pivoted adjacent each end of each main track and serving as a continuation thereof, and auxiliary tracks which can be joined to or separated from the connecting tracks. The groove pattern constrains the racks and guides them even around the vertex of the angle formed when the connecting and auxiliary tracks are inclined with respect to the main tracks. The keying means on the racks enables them to propel the platform up or down an incline so that the device may be used for transferring the platform between substantially different levels. When the platform is in transporting position on the vehicle, the auxiliary tracks may be removed, and the connecting tracks may be swung up to a position perpendicular to the main tracks and locked there to hold the loaded platform steady during transport.

In considering the specific embodiment now to be described in detail, it should be understood that although the device is illustrated in connection with a truck 10, it can be adapted with a few changes for use on a railroad car, airplane, ship, or still other type of vehicle. When using it on trucks or railroad cars, a convenient size for the load-supporting platform 11 is about eight feet long by six feet wide. A platform 11 of this size is best placed with its long dimension set crosswise of the truck 10. Three of these units may be set side by side on a truck having an eighteen-foot bed or four units may be similarly arranged on a standard twenty-four-foot trailer.

Figure 3:
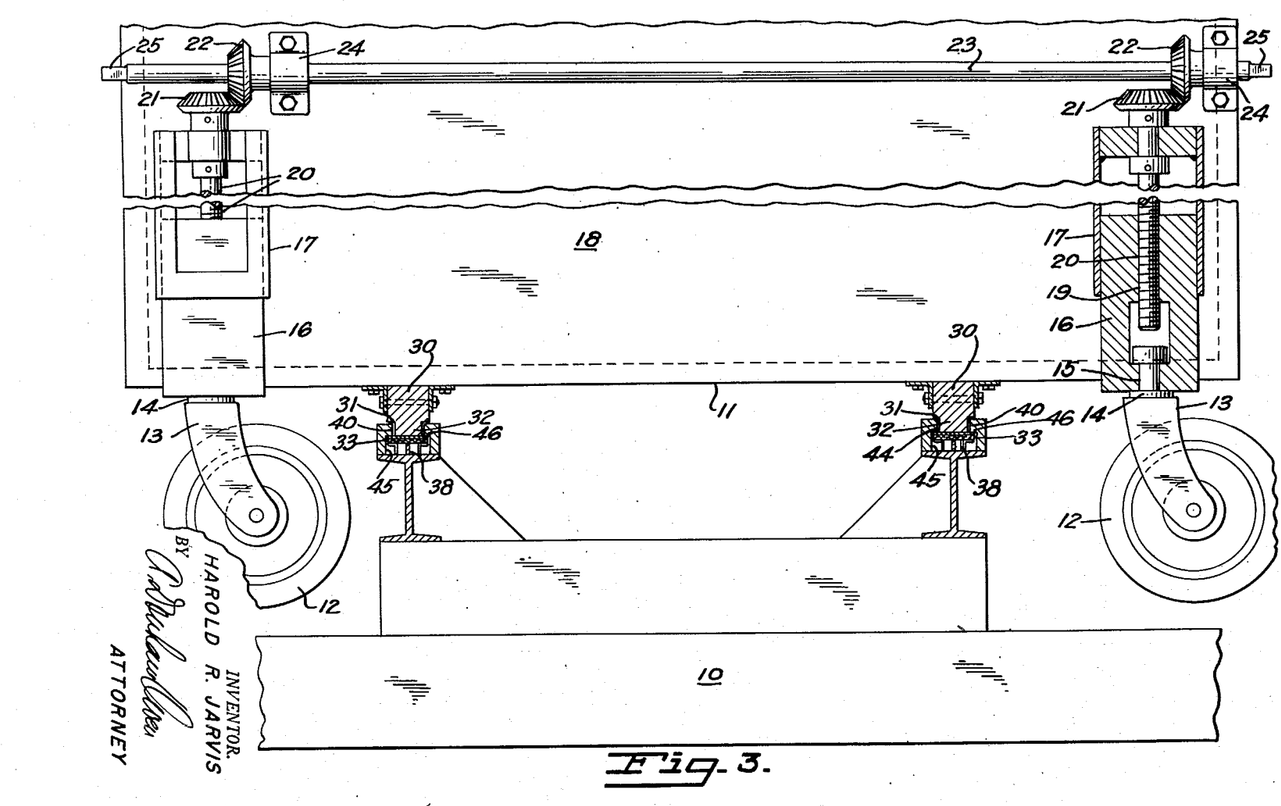
Fig. 3 is a view in elevation and in section taken along the line III—III of Fig. 1.

The platform 11 is also a warehouse dolly with retractable casters 12 at each corner, as shown in Fig. 3. The caster wheels 12 are supported by swivel frames 13 whose upper pivot members 14 fit in sockets 15 in the lower end of rectangular blocks 16. Each block 16 is slidable within a hollow guide member 17 fixed on an outside wall 18 of the platform 11. The block 16 has a central threaded bore 19 which rides on the screw thread of a vertical rod 20. At the top of the rod 20 a bevel gear 21 is keyed, to mesh with another bevel gear 22 on an axle 23, mounted for free rotation in the brackets 24 fixed to the wall 18. Each axle 23 may control two rods 20 and two casters 12, as shown in Fig. 3. A crank handle or power tool (not shown) may be attached to either of the axle's keyed ends 25 for rotation of the axle 23 and raising or lowering of the wheels. Normally the wheels are retracted when the platform is placed on the truck and lowered when the platform is moved onto the warehouse dock.

Figure 4:
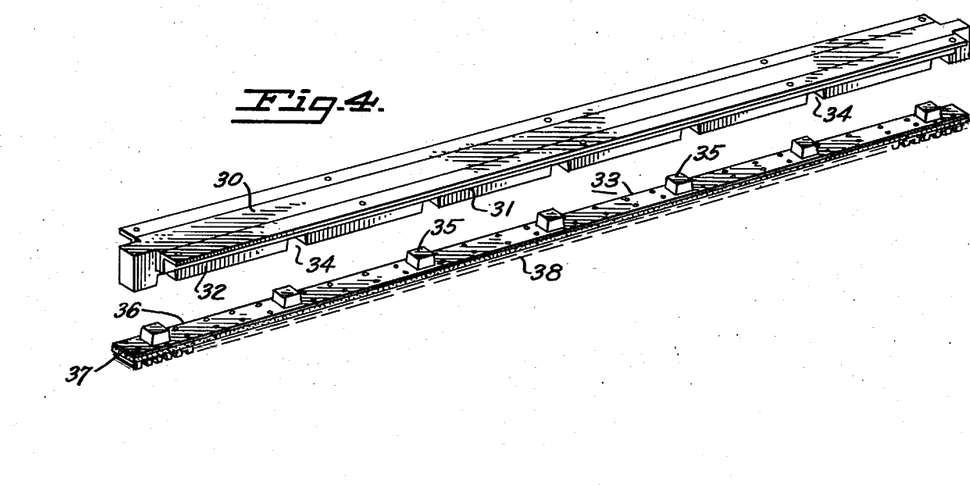
Fig. 4 is a view in perspective of a movable, flexible guide rack and suspended above it a rail of the type which carries the load-supporting platform, showing a block and notch structure by which the rack and rail may be keyed for movement together.

Bolted to the bottom of the platform 11 are two parallel rails 30. In each rail the lower portion is preferably offset inwardly to provide a pair of flanges 31 and a depending tongue 32. Each of the rails 30 is adapted to be propelled linearly by a flexible rack 33, and for that purpose (see Fig. 4) the rail tongue 32 is recessed by a plurality of transverse spaced notches 34 which engage a corresponding plurality of spline blocks 35 on the upper surface of the rack 33. The notches 34 are somewhat longer than the blocks 35, so that when the rack 33 turns around the vertex of an angle (see Figs. 6 and 7) and the distance between the blocks becomes shorter, there is still sufficient clearance to permit relative movement of the notches up and down over the blocks as the platform shifts relatively to the racks.

Each flexible rack 33 preferably comprises a thin strip 36 of spring steel, somewhat wider than either the rail 30 or the blocks 35 which are mounted on the upper surface of the steel strip. To the steel strip's lower surface a resilient cushioning strip 37 is secured, and to the cushion's lower surface is secured a gear-tooth type chain 38, known in industry as a Morse chain. The lower surface of the rack 33 thus comprises a chain 38 which can be driven by a suitable gear, and the rack's upper surface comprises a keying means 35 which can carry along the rail 30 and the load-supporting platform 11.

Each of the racks 33 is designed to slide in and be guided by a groove 40 in the top surfaces of main, connecting, and auxiliary tracks 41, 42, and 43, respectively. Preferably the groove 40 is shaped like an inverted T, having a narrow neck portion 44 in which the rail 30 can move and a wide restraining channel portion 45 in which the rack 33 moves. The shoulders 46 on either side of the narrow neck 44 serve to restrict the upward movement of the strip 36, while the blocks 35 and rail tongue 32 move along inside the narrow neck portion 44, the flanges 31 resting either just above or on the upper surface of the tracks.

Figures 2, 13, 14:
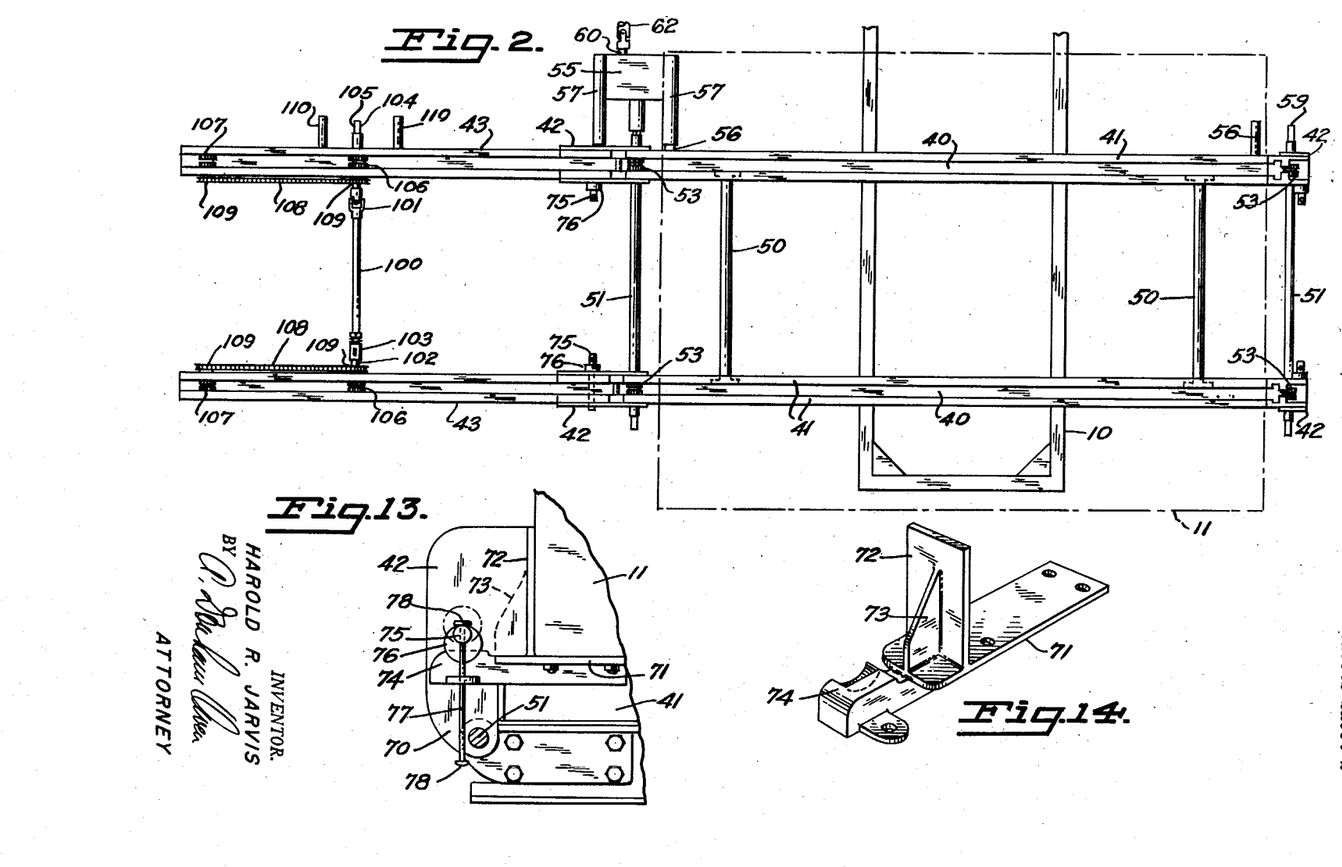
Fig. 2 is to top plan view of the device shown in Fig. 1, with the load and the load-supporting platform removed therefrom, the space usually occupied by the platform being outlined in dotted lines.
Fig. 13 is a detail view in elevation of a connecting track locked in its upper position where it holds the load-supporting platform steady with respect to the main track.
Fig. 14 is a view in perspective of a bracket or latch of the type which is on the load-supporting platform and in which the cam of the connecting track is locked in Fig. 13.
Figures 5, 6:
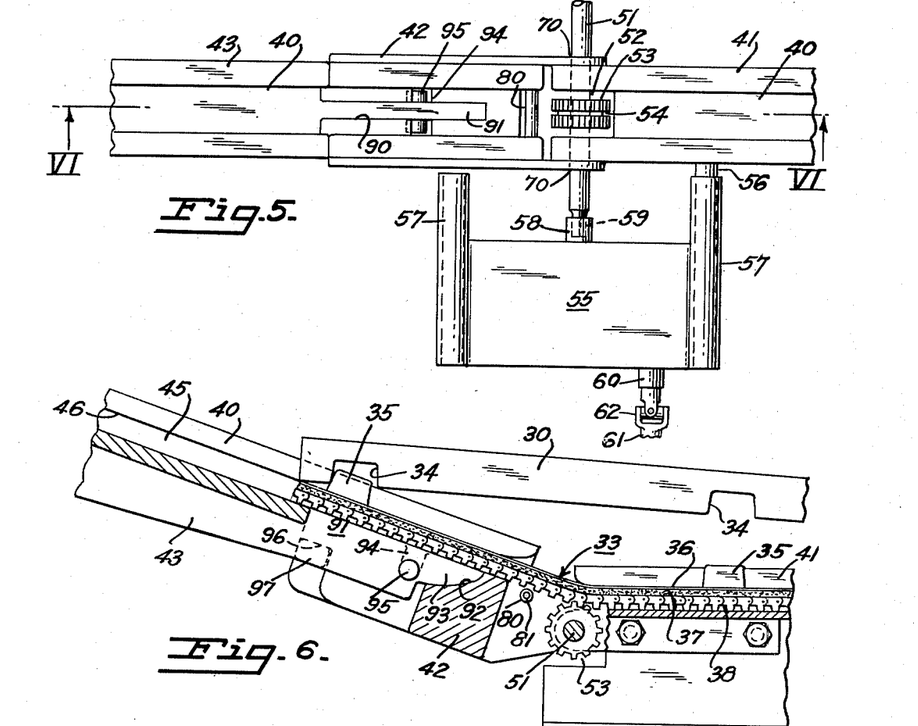
Fig. 5 is a top plan view of a portion of the device in the vicinity of a lowered connecting track which serves to join a detachable, auxiliary guide track to one of the permanently-installed main guide tracks.
Fig. 6 is a view in elevation and in section along the line VI—VI in Fig. 5, but showing a flexible guide rack partly in the main track, which is level, and partly in the auxiliary and connecting tracks, which are upwardly inclined and lead to a level higher than the vehicle bed.

The main tracks 41 are securely fixed transversely across the truck frame 10 (see Fig. 2) and are steadied near each end by cross spacers 50. Adjacent each end a drive axle 51 is journaled through the pair of tracks 41, below the bottom of the groove 40. Each end of each track 41 is inwardly recessed by a vertical slot 52 in which fits a drive gear 53, a pair of which are keyed to each axle 51 to mesh with the chain 38 and drive the racks 33. For that purpose the upper portion of each gear 53 extends slightly above the level of the floor of the groove 40. As shown in Fig. 5, each gear 53 bears a central circumferential groove 54 which permits passage of the central linking member of the chain 38.

The power which drives the gears 53 and moves the racks 33 is supplied through a removable, portable reduction-gear box 55. The box 55 is supported by the axle 51 and a stud 56 projecting from the side of at least one of the main tracks 41. The box 55 is preferably made symmetrical, so that it can fit on either end. A pair of fixed sockets 57, each of which can fit around the studs 56, are symmetrically disposed, one on each side of a central rotating socket 58 which can be locked around a keyed end 59 of the axle 51. The socket 58 is connected through a train of gears (not shown), to an input shaft 60 whose socket 61 is mounted on a universal joint 62. A hand crank or the keyed end of a portable rotating tool (neither of which are shown) may be inserted in the socket 61 and used to drive the two racks 33 at identical speeds along inside the wide portion 45 of the groove 40.

The connecting tracks 42 are pivotally secured to the axle 51 by its end brackets 70 on each side of each end of the main tracks 41. When swung up perpendicularly (see Fig. 13) each connecting track 42 may be used to lock a corner of the load platform 11 securely so as to prevent its displacement along the main tracks while the vehicle is moving. For this purpose, an L-bracket 71 (see Fig. 14) is bolted to the bottom and edges of the platform 11 adjacent each end of the rails 30. The upright arm 72 of the bracket 71 has a forwardly-projecting tongue 73 which fits in the hollow 44 of the connecting track 42 and helps prevent swaying. To the front end of the L-bracket 71 is secured a forwardly-projecting cam-faced latch plate 74. Journaled for free rotation in the connecting track 42 is a short rod 75 to which a disc 76 is keyed at a point off the center of the disc. The inside end of the rod 75 is perforated and receives a loose-fitting handle 77 with enlarged stop ends 78. When the connecting track 42 is raised to the position shown in Fig. 13 it may be locked there by turning the handle 77 forcing the eccentrically-mounted wheel 76 down against the cam surface of the plate 74. The connecting track 42 is released by rotating the handle 77 in the other direction so as to lift the wheel 76 out of engagement with the cam surface 74.

Figure 7:
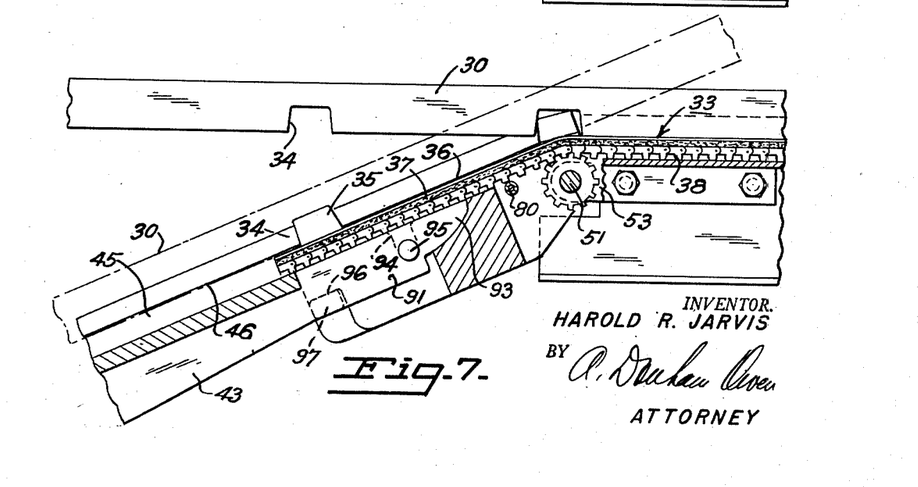
Fig. 7 is a view similar to Fig. 6, but the auxiliary and connecting tracks are inclined downwardly and lead to a level below the level of the truck bed; the level position of the platform-supporting rail is shown in solid lines, and its inclined position is shown in dotted lines.

When the connecting track 42 is lowered into the positions shown in Figs. 5, 6, and 7, its groove 40 is aligned with the groove 40 in the main track 41 so that the rack 33 is guided from one to the other even when they are disposed at a substantial angle, as in Figs. 6 and 7. The strip 36 is guided around an angle and down (Fig. 7) as it engages beneath the curved shoulder 46 of the connecting track, and it then follows the inclined path. To assist the rack 33 in making an upward turn, a roller 80 is supported with its upper surface tangential to the floor of the groove 40, on stub shafts 81 journaled in the brackets 70. When the track 42 is upwardly inclined, the Morse chain 38 comes against the roller 80 and slides over it and onto the floor of the guiding groove 40.

The connecting track 42 is bifurcated at its outside end to provide a socket 90, into which the tongue 91 of the auxiliary track 43 may be locked for further extension of the guide groove 40 (see Figs. 8–12), the linkage being more fully described in my co-pending application Serial No. 10,543, filed February 18, 1948. The inner end of the socket 90 is a sloping shelf 92 upon which a tapered forward portion 93 of the tongue 91 rests when the linkage is complete. A pair of short vertical slots 94 in the floor of the groove 40 provide bearings and restraints for a front pivot pin 95 which transfixes the tongue 91 adjacent its tapered portion 93. At the open end of the socket 90 there is a thrust shelf 96 which engages, when the linkage is completed, the upward-thrusting thrust blocks 97 on either side of the rear of the tongue 91. The bottom of the slot 94 and the thrust shelf 96 are at substantially the same level, as are the bottom of the pivot pin 95 and the top of the thrust blocks 97 so that the grooves 40 will be aligned when the linkage is completed.

Figures 8, 9, 10, 11, 12:
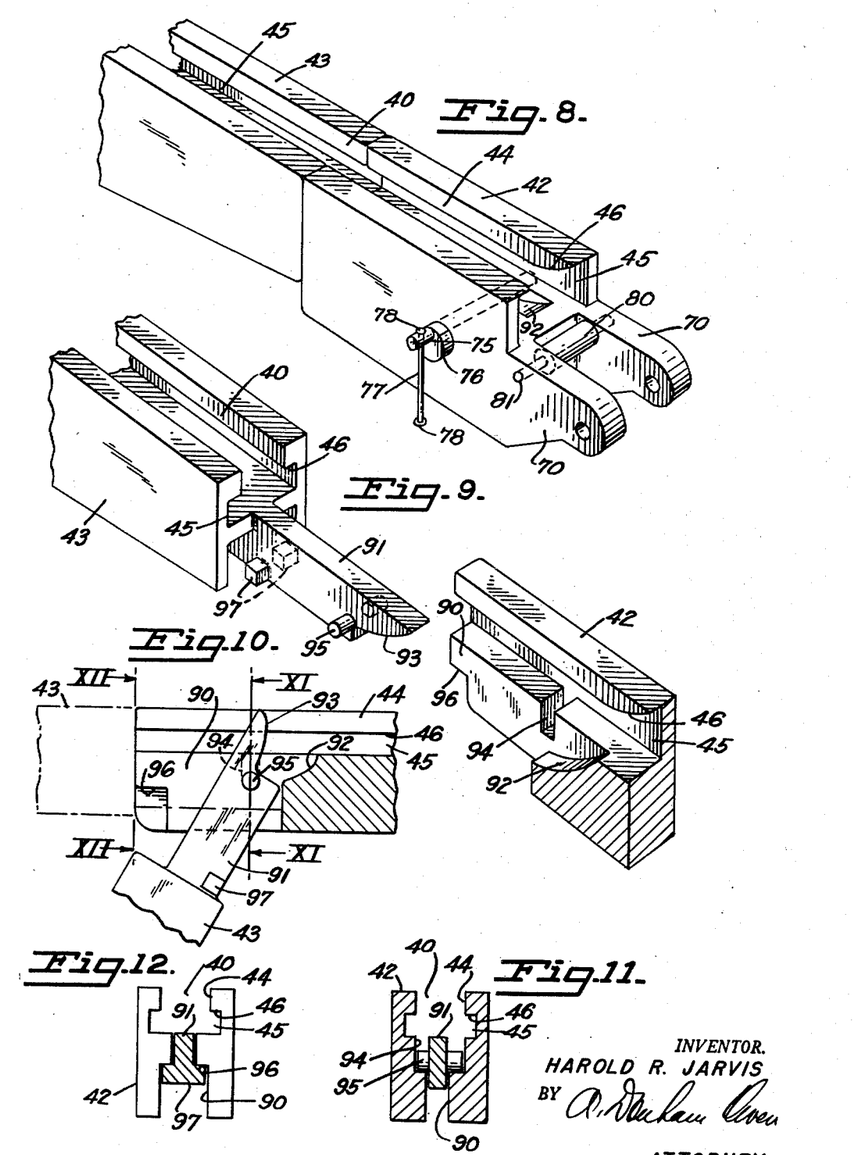
Fig. 8 is a view in perspective of a connecting track and a portion of an auxiliary track joined thereto.
Fig. 9 is a view in perspective of the two tracks of Fig. 8 unlinked and moved apart to show the linkage means by which they can be joined, the right-hand, or connecting track being partly cut away to show its interior structure.
Fig. 10 is a view in elevation and partly in section showing the linkage of the same two tracks; the left-hand or auxiliary track is shown in full lines and its position at the beginning of the linking operation just after its pivot pin has been placed in the slot in the connecting track, and its final linked position of Fig. 8 is shown in dotted lines.
Fig. 11 is a view in section along the line XI—XI in Fig. 10, the tracks being in their linked position.
Fig. 12 is a view partly in section along the line XII—XII in Fig. 10, the tracks again being shown in their linked level position.

The manner of making the juncture is as follows: the tracks 42 and 43 are held at an angle such as that shown in Fig. 10, to permit clearance of the parts, and the tongue 91 is slid into the socket 90, the pin 95 being slid along in the wide portion 45 of the groove 40 until it falls down into the slots 94. Then the tracks are rotated relatively to each other, using the pin 95 and slots 94 as pivot and bearing, until the tracks are aligned as shown in Fig. 8, and in dotted lines in Fig. 10. At that time, the thrust blocks 97 engage the thrust shelf 96 and the forward portion 93 of the tongue rests on the tapered shelf 93, preventing further movement and aligning the grooves 40. The disposition of forces, enhanced by gravity and by a load pressing down, strengthen the juncture. To disconnect the pieces, all that is needed is to rotate the tracks in the reverse direction, lift the pin 95 from the slots 94 and slide it out along the groove 45.

The pair of auxiliary tracks 43 are spaced apart by an axle 100 (see Fig. 2) which is held by a universal swivel joint 101 on the inside edge of one of the auxiliary tracks 43. In the other track 43 a short shaft 102 is journaled for free rotation, its inside end 103 being a socket in which the other end of the axle may be locked and held steady when the tracks 43 are being used at its other end. When the auxiliary tracks 43 are to be removed from the connecting tracks 42 and stowed in the truck 10 or stored at the warehouse, the end of the axle 100 is withdrawn from the socket 103 and folded in against its track 43.

The universal joint 101 is at one end of a shaft 104 which passes through to the other side of the track 43 and terminates in a keyed end 105. To each of the shafts 102 and 104 is keyed a gear 106, in all respects like the gears 53, and, like them, disposed in a recess in or opening through the bottom of the groove 40 so as to be able to drive the rack 33. If desired, additional gears 107 may be placed in a slot adjacent the end of the tracks 43 so that the racks 33 can be driven out to or in from the very end of the tracks 43. In that event, a chain 108 is preferably provided, to engage sprockets 109 on the shafts which support the gears 106 and 107, and thereby to link the gears 107 to the drive shaft 102. One or more studs 110 are provided on the outside edge of the track 43 which holds the axle 100 and shaft 102 and upon it, or them, the sockets 57 of the gear box 55 may be placed. The socket 58 is then placed on the keyed end 105 of the shaft 102, so as to drive both sets of gears 106 and 107.

Figure 1:
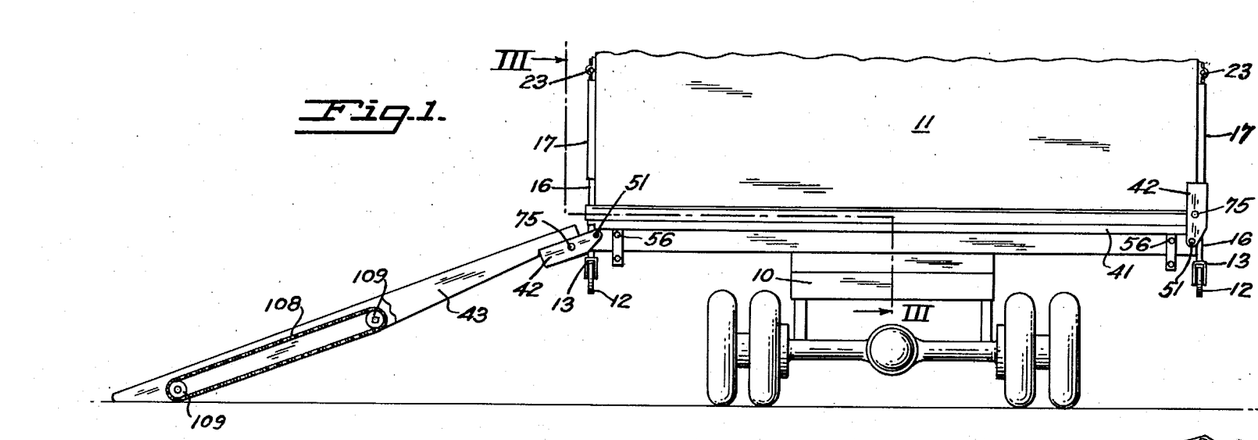
Fig. 1 is a view in rear elevation of a truck employing a device embodying the principles of this invention, showing a pair of auxiliary tracks attached to the device and arranged for loading or unloading between the truck bed and the ground level, a portion of one of the auxiliary tracks being cut away.

The operations of loading and unloading are made very simple by this invention. The truck need not be aligned to the dock with especial care; in fact, as shown in Fig. 1, it is possible to transfer the load directly to the ground level. For this purpose, when the load is on the truck, the connecting tracks 42 on both sides of the truck 10 are unlocked from their perpendicular position by raising the eccentric wheel 76 out of the cam 74. An auxiliary track 43 is linked to each of the two tracks 42, by inserting the tongue 91 in the socket 90 and sliding the pin 95 along the groove 45 until it falls in the slots 94. Then the two tracks 42 and 43 are swung relatively to each other about the pin 95 until blocks 97 bear against thrust shelves 96 and the tongue 93 rests on its shelf 92. In this position, the tracks 43 are lowered until their far ends rest on the ground or the dock. The axle 100 is then swung out and locked in the socket 103.

Next, the gear box 55 is placed near a track juncture, one of its sockets 57 engaging the stud 56 and its socket 58 keyed in the shaft end 59. A crank or power tool is placed in the input socket 61, and thereby the axle 51 is rotated. As the gear 53 turns, it engages the Morse chain 38 and moves the flexible racks 33 along the grooves 40. At the same time the platform 11 is moved, its rails 30 being keyed to the blocks 35 on the racks 33 and moving along the groove neck 44.

If the tracks 42 and 43 are downwardly inclined (Figs. 1 and 7), the racks 33 follow the grooves 45 down, and the rails 30 continue level, above the rack, (as shown in solid lines in Fig. 7) until the center of gravity of the load is passed. Then the load pivots around the central block 35, the rear notches 34 leave the blocks on the portion of the rack which is still level and the forward notches 34 pass down over and engage the forward, inclined blocks 35. (This position is shown in dotted lines in Fig. 7.) Once this critical position is passed, the platform 11 is inclined with the racks 33 and is carried on down.

If the tracks 42 and 43 are upwardly inclined (Fig. 6), the racks 33 ride over the rollers 80 and are brought up into the grooves 45. At this point the rails 30 are lifted at their front ends, and all of the notches 34 except those at or near the ends are gradually lifted out of engagement with their blocks 35. After the center of the platform passes over the vertex of the angle, the central notches 34 begin to lower and gradually interlock with their blocks 35 again.

When the racks 33 are past the gears 53, the box 55 may be moved to drive the shafts 102 and 104 to the axle 100, so that the racks 33 will be driven by the gears 106 and 107. When the platform 11 approaches the end of the tracks 43 the forward pair of casters 12 may be lowered so that further movement along the track will bring these casters into contact with the floor and support the front part of the platform 11 as it lifts off the racks 33, with the rear block still engaging the rear notch. The racks 33 are then moved forward again, pushing the platform 11 along. The casters 12 are self-aligning so that there is no need for the operator to stop and turn them to guide the platform. When the rear end of the platform nears the end of the racks 33, the rear pair of casters 12 are lowered so that further movement along the track will bring these casters into contact with the floor and support the platform 11 above the racks. Then the platform may be wheeled wherever desired. The loading operation is the same as the unloading operation, with the steps being taken in reverse order.

As shown in Fig. 1 the load may be lowered from the vehicle chassis all the way to ground level, provided the ground is hard enough for the wheels to sustain the load. While the device has been described in connection with a truck or trailer chassis, it is intended to be used on all types of vehicles, including sleds, boats, railway cars, airplanes, rockets, etc. It requires no special kind of chassis. The flexible rack drive unit 43 can even be used for transferring a platform 11 from or to a unit which has no special tracks 41 to receive the rack. In this case the wheels or skids on the platform support the load until it is taken over by the auxiliary track 43. This feature is especially important in the changeover period when all the vehicle units have not yet had the tracks 41 installed.

The flexible rack 33 can be utilized in other environments where it is desired to move a weight over an uneven surface. Power can be applied through the gears 106 to the rack, regardless of the position or path of the weight and at all times the weight is under control.

I claim:

1. A freight-handling device, including in combination a plurality of parallel spaced main tracks secured to the body of a transporting vehicle; a corresponding plurality of similarly shaped auxiliary tracks adapted to be connected to either end of said main tracks; a corresponding plurality of flexible racks; means in said tracks to guide and restrain said racks for linear movement along the tracks; means connected to said tracks for driving said racks; and a platform having a plurality of spaced-apart base rails corresponding in number to and keyed to said racks for linear movement therewith.

2. The device of claim 1, in which said platform also has a plurality of retractable casters, adaptable to support the platform when said platform is unloaded from said device, so that the platform can thereby be lifted off and rolled away from said tracks.

3. A freight-handling device, including in combination a pair of parallel spaced main tracks secured to the body of a transporting vehicle, each track having along its upper surface a guiding groove, a lower channel portion of said groove being wider than its surface width; a pair of similarly grooved auxiliary tracks adapted to be connected to either end of said main tracks; a pair of flexible racks each slidable in and guided by the wide channel portion of said grooves; means associated with said tracks for driving said racks in said grooves; and a platform having a pair of spaced-apart base rails slidable within the upper narrower portion of said grooves and keyable to the upper portion of said racks for linear movement therewith.

4. The device of claim 3, in which the platform has a plurality of retractable casters, adaptable to support the platform when said platform is unloaded from said device, so that the platform can thereby be lifted off and rolled away from said tracks.

5. The device claimed in claim 3, in which said flexible racks each comprise a Morse type of drive chain fixed to the bottom of a flexible strip of spring metal.

6. The device claimed in claim 3, in which each rail is keyed to its rack by a means restricting relative axial linear movement while permitting relative vertical and axial swinging movement.

7. The device claimed in claim 6, in which the keying means consist of a plurality of matching blocks and notches, said notches having sufficient clearance for the blocks so that the rails and racks are keyed even when the flexible rack is passing around the vertex of an angle while said rail remains rigid and straight.

8. A freight-handling device, including in combination a pair of parallel spaced main tracks secured to the body of a transporting vehicle, each track having along its upper surface an inverted T groove; a pair of similarly grooved auxiliary tracks adapted to be connected to either end of said main tracks; a pair of flexible racks each slidable in and guided by the T-arm section of said grooves; means associated with said tracks to drive said racks in said grooves; and a platform having a pair of spaced-apart base rails slidable within the leg portion of said grooves and keyable to said racks for linear movement therewith.

9. A freight loading, carrying, and transferring device comprising a pair of parallel spaced grooved main tracks; a pair of similarly grooved connecting tracks pivotally secured to each end of said main tracks; a pair of similarly grooved auxiliary tracks adapted to be connected to either pair of said connecting tracks; a pair of flexible racks slidable in and guided by the grooves of said tracks; means in said tracks to hold said racks in said grooves; and a platform having a pair of spaced-apart based rails slidable in the grooves of said tracks and keyable to said racks for linear movement therewith.

10. The device claimed in claim 9, in which the connecting tracks are adapted to be disengageable from the auxiliary tracks and liftable into a position where they can be locked to hold the platform steady on the main tracks during transport.

11. The device claimed in claim 10, in which the connecting tracks are held in locking position by a disc held on said connecting track and rotatable about an eccentrically located locus and movable into and against a cam connected to said platform.

12. A flexible driving member for use in a freight-handling device employing a plurality of spaced-apart grooved tracks, propelling means associated therewith, and a platform with a corresponding plurality of similarly spaced base rails having keying means on their lower surfaces; said flexible driving member comprising a flexible resilient strip having on its upper surface keying means corresponding to the keying means on said rail and on its lower surface means adapted to be driven by said propelling means.

13. A flexible driving member for use in a freight-handling device employing a plurality of spaced-apart grooved tracks, propelling means associated therewith, and a platform with a corresponding plurality of similarly spaced base rails having keying means on their lower surfaces; said flexible driving member comprising a flexible resilient strip having on its upper surface keying means corresponding to the keying means on said rail and on its lower surface gear teeth adapted to be driven by said propelling means.

14. A flexible driving member for use in a freight-handling device employing a plurality of spaced-apart grooved tracks, propelling means associated therewith, and a platform with a corresponding plurality of similarly spaced base rails having keying means on their lower surfaces; said flexible driving member comprising a flexible resilient strip having on its upper surface keying means corresponding to the keying means on said rail and a gear tooth type of chain secured to the lower surface of said strip.

15. A flexible driving member for use in a freight-handling device employing a plurality of spaced-apart grooved tracks, propelling means associated therewith, and a platform with a corresponding plurality of similarly spaced base rails having stud-receiving notches on their lower surfaces; said flexible driving member comprising a flexible, resilient strip having a plurality of studs on its upper surface and a gear-tooth type of chain secured to the lower surface of said strip.

16. A flexible driving member for use in a freight-handling device employing a plurality of spaced-apart grooved tracks, propelling means associated therewith, and a platform with a corresponding plurality of similarly spaced base rails having notched lower surfaces; said flexible driving member comprising a metallic strip, a plurality of keying blocks secured to the upper surface of said strip, and a gear-tooth type of chain secured to the lower surface of said strip.

17. A flexible driving member for use in a freight-handling device employing a plurality of spaced-apart grooved tracks, propelling means associated therewith, and a platform with a corresponding plurality of similarly spaced base rails having notched lower surfaces; said flexible driving member comprising a metallic strip, a plurality of keying blocks secured to the upper surface of said metallic strip, a cushioning strip secured to the lower surface of said metallic strip and a gear-tooth type of chain secured to the lower surace of said metallic strip.

18. A flexible driving member for use in a freight-handling device employing a plurality of spaced-apart grooved tracks, propelling means associated therewith, and a platform with a corresponding plurality of similarly spaced base rails having notched lower surfaces; said flexible driving member comprising a strip of spring metal, a plurality of keying blocks secured to the upper surface of said metal strip, a strip of cushioning material secured to the lower surface of said metal strip, and a chain of the gear-tooth type secured to the lower surface of said cushioning strip.

19. A transporting member for use in a trackway having a propelling means associated therewith, comprising a flexible rack slidable along said trackway and drivable by said propelling means.

20. The transporting member claimed in claim 19, in which the flexible rack comprises a flexible, resilient strip having teeth on its underside to engage with said propelling means.

21. The transporting member claimed in claim 19, in which the flexible rack has interlocking means on its upper surface to engage an element to be moved.

22. A driving member for use with an undulating trackway having propelling means associated therewith, comprising a flexible rack slidable along and comformable to said trackway and engageable by said propelling means.

23. A conveyor system especially suitable for movement along a non-level path comprising a trackway in which some sections lie at a different slope from other sections, propelling means associated therewith, and a flexible rack slidable along and conformable to said trackway and drivable by said propelling means.

HAROLD R. JARVIS.

REFERENCES CITED

The following references are of record in the file of this patent:

UNITED STATES PATENTS

| Number | Name | Date |
| --- | --- | --- |
| Re. 20,760 | Ludington | June 14, 1938 |
| 777,020 | Hampton | Dec. 6, 1904 |
| 1,261,967 | Stoltze | Apr. 9, 1918 |
| 2,266,791 | Norbom | Dec. 23, 1941 |
| 2,467,354 | Baldwin | Apr. 12, 1949 |